(12) United States Patent
Nam et al.

(10) Patent No.: US 9,225,203 B2
(45) Date of Patent: Dec. 29, 2015

(54) METHOD, SYSTEM AND COMPUTER-READABLE RECORDING MEDIUM FOR TRANSFERRING WIRELESS POWER BY USING ANTENNAS WITH HIGH ORDERS OF SPHERICAL MODES

(75) Inventors: Sang Wook Nam, Seoul (KR); Yoon Goo Kim, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 989 days.

(21) Appl. No.: 13/397,522

(22) Filed: Feb. 15, 2012

(65) Prior Publication Data

US 2013/0207477 A1   Aug. 15, 2013

(51) Int. Cl.
*H01F 27/42* (2006.01)
*H02J 17/00* (2006.01)
*H01Q 11/08* (2006.01)

(52) U.S. Cl.
CPC ................ *H02J 17/00* (2013.01); *H01Q 11/08* (2013.01)

(58) Field of Classification Search
CPC ........... H02J 17/00; H02J 5/005; H02J 7/025; H02J 3/01; H01F 38/14; B60L 11/182; B60L 11/1829; B60L 11/1831; Y02T 90/122; H04B 5/0037; H01Q 11/08
See application file for complete search history.

(56) References Cited

U.S. PATENT DOCUMENTS

| | | | |
|---|---|---|---|
| 2009/0284083 A1* | 11/2009 | Karalis | ................ H01Q 1/02 307/104 |
| 2010/0148589 A1* | 6/2010 | Hamam | ............... H04B 5/0037 307/104 |

* cited by examiner

*Primary Examiner* — Daniel Cavallari
(74) *Attorney, Agent, or Firm* — Husch Blackwell LLP

(57) ABSTRACT

The present invention relates to a system for transferring wireless power or signal. The system includes a first antenna; and a second antenna which is located from the first antenna at an arbitrary distance and arranged in an arbitrary direction in comparison with the first antenna, wherein respective spherical modes of the first antenna and the second antenna are allowed to have orders which are same as or larger than a predetermined value to thereby transfer wireless power between the first antenna and the second antenna.

3 Claims, 19 Drawing Sheets

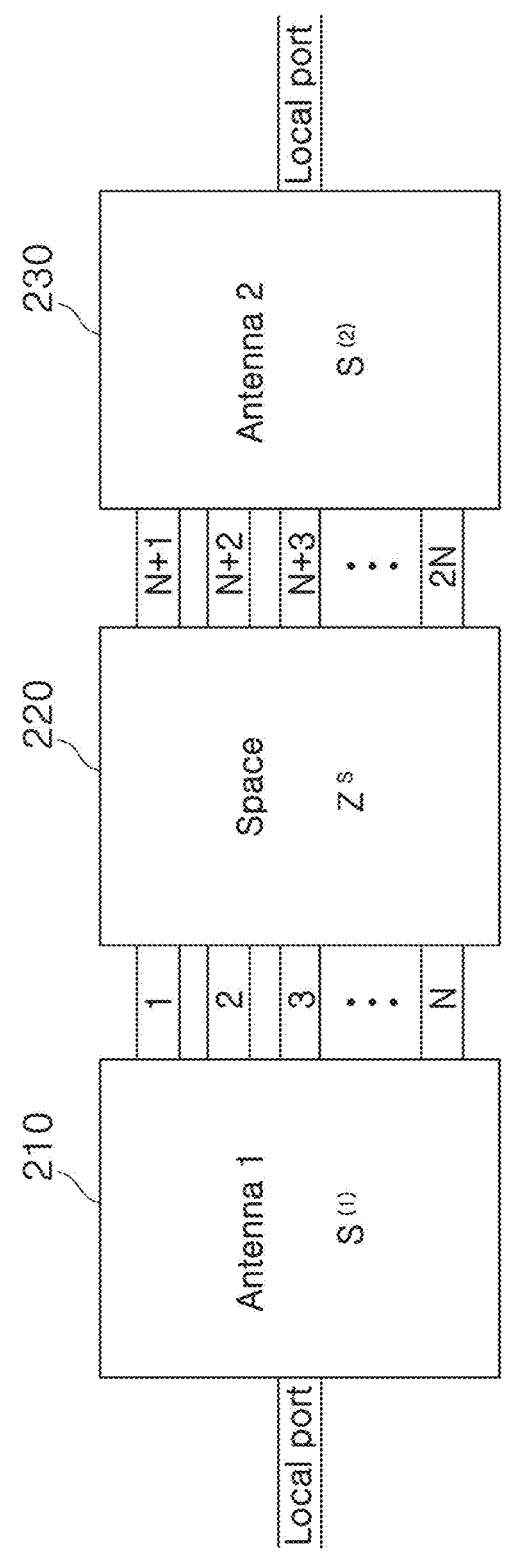

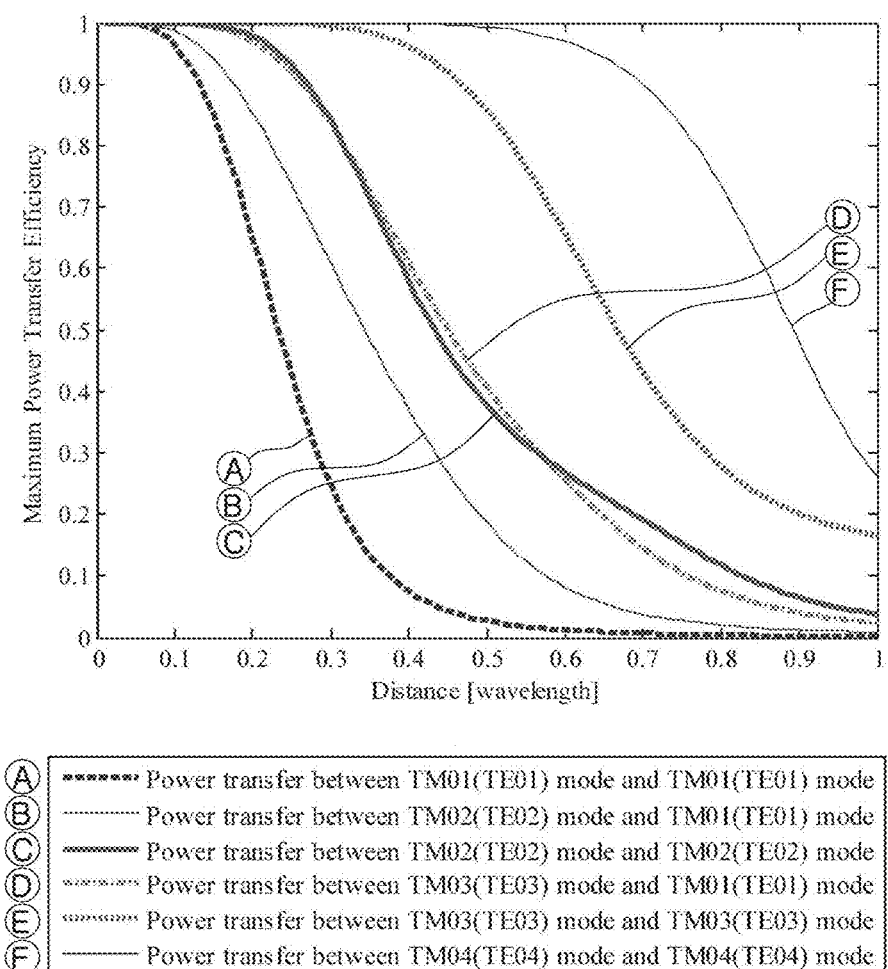

FIG. 5
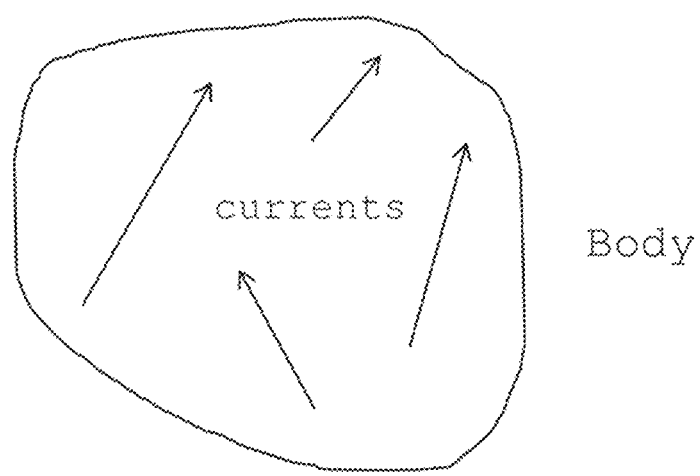
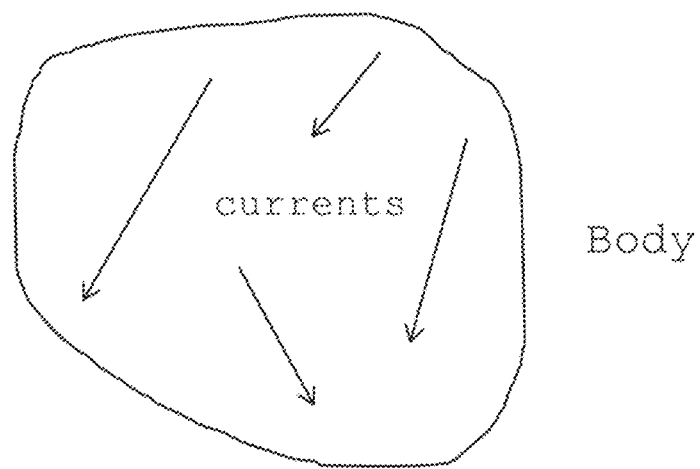

METHOD, SYSTEM AND COMPUTER-READABLE RECORDING MEDIUM FOR TRANSFERRING WIRELESS POWER BY USING ANTENNAS WITH HIGH ORDERS OF SPHERICAL MODES

FIELD OF THE INVENTION

The present invention relates a structure of antenna and a method, a system and a computer-readable recording medium for transferring wireless power by using the same with high orders of spherical modes; and more particularly, to the structure of antenna and the method, the system and the computer-readable recording medium for transferring wireless power by using a first antenna and a second antenna which is located from the first antenna at an arbitrary distance and arranged in an arbitrary direction in comparison with the first antenna, wherein respective spherical modes of the first antenna and the second antenna are allowed to have orders which are same as or larger than a predetermined value to thereby transfer wireless power between the first antenna and the second antenna.

BACKGROUND OF THE INVENTION

Nowadays, near-field wireless power transfer and near-field communication are receiving much attention and are being widely studied.

So far, many people have tried or experimented to transmit power wirelessly in the near-field region using antennas generating mostly a fundamental spherical mode.

Several analysis models for the near-field wireless power transfer have been proposed. The methods for transferring wireless power include a method using coupled mode theory, a method using an equivalent circuit, and a method using filter theory. Other methods for transferring wireless power include a method for analyzing wireless power transfer using spherical modes and minimum scattering antennas. The use of a spherical mode has advantages in that the characteristics of wireless power transfer may be determined solely by the properties of an isolated antenna (e.g. an input impedance and a radiation efficiency thereof). It is not necessary to solve the boundary value problem for the boundary where the detailed geometry of the two antennas exist. According to a conventional art such as an article titled "Fundamental aspects of near-field coupling small antennas for wireless power transfer" authored jointly by J. Lee and S. Nam and published in *IEEE Transactions on Antennas and Propagation*, vol. 58, no. 11, pp. 3442-3449, November 2010, however, the characteristics of wireless power transfer when two antennas are identical and generate only the fundamental modes are investigated.

SUMMARY OF THE INVENTION

It is an object of the present invention to solve all the problems mentioned above.

It is another object of the present invention to provide a system including the first antenna and the second antenna whose respective spherical modes are allowed to have orders which are same as or larger than a predetermined value to thereby transfer wireless power between the first antenna and the second antenna.

In accordance with one aspect of the present invention, there is provided a system for transferring wireless power or signal including: a first antenna; and a second antenna which is located from the first antenna at an arbitrary distance and arranged in an arbitrary direction in comparison with the first antenna, wherein respective spherical modes of the first antenna and the second antenna are allowed to have orders which are same as or larger than a predetermined value which is an integer greater than 1 to thereby transfer wireless power between the first antenna and the second antenna.

In accordance with another aspect of the present invention, there is provided a method for acquiring an efficiency of power transfer in a wireless power transfer system, wherein the wireless power transfer system includes a first antenna; and a second antenna which is located from the first antenna at an arbitrary distance and arranged in an arbitrary direction in comparison with the first antenna, and wherein respective spherical modes of the first antenna and the second antenna are allowed to have orders which are same as or larger than a predetermined value which is an integer greater than 1 to thereby transfer wireless power between the first antenna and the second antenna, including the steps of: (a) acquiring scattering matrixes of the first antenna and the second antenna; (b) acquiring a mode coefficients conversion matrix between the coordinate of the first antenna and that of the second antenna, (c) acquiring Z-parameter or Y-parameter, reflecting mutual coupling effect between the first antenna and the second antenna, by referring to the acquired scattering matrixes and mode coefficients conversion matrix; and (d) acquiring the maximum efficiency of power transfer between the first antenna and the second antenna by referring to the acquired Z-parameter or the Y-parameter.

In accordance with still another aspect of the present invention, there is provided a structure of antenna including: a first body that generates TEmn (TMmn) mode, and a second body that also generates TEmn (TMmn) mode, wherein the first body and the second body are apart from each other and a phase of a current flowing in the first body and that in the second body are controlled to be different by 180 degree to thereby a spherical mode of the antenna is allowed to have an order which is same as or larger than a predetermined value which is an integer greater than 1.

In accordance with still another aspect of the present invention, there is provided a system of antennas including: a first antenna and a second antenna, wherein the first antenna and the second antenna, respectively, include both a first body that generates TEmn (TMmn) mode and a second body that also generates TEmn (TMmn) mode, and wherein the first body and the second body are apart from each other and a phase of a current flowing in the first body and that in the second body are controlled to be different by 180 degree to thereby a spherical mode of the antenna is allowed to have an order which is same as or larger than a predetermined value which is an integer greater than 1.

BRIEF DESCRIPTION OF THE DRAWINGS

The above and other objects and features of the present invention will become apparent from the following description of preferred embodiments given in conjunction with the accompanying drawings, in which:

FIG. 2 is a drawing presenting a network representation of two coupled antennas in accordance with one example embodiment of the present invention.

FIGS. 3A and 3B show the maximum power transfer efficiencies between the $TM_{0n}$ mode antenna and the $TM_{0v}$ mode antenna when the radiation efficiencies are 1 in accordance with one example embodiment of the present invention.

FIG. 5 shows an antenna, capable of making $TM_{02}$ ($TE_{02}$) mode, comprised of two bodies that respectively generate $TM_{01}$ ($TE_{01}$) mode in accordance with one example embodiment of the present invention.

DETAILED DESCRIPTION OF THE PREFERRED EMBODIMENTS

Figure 1:
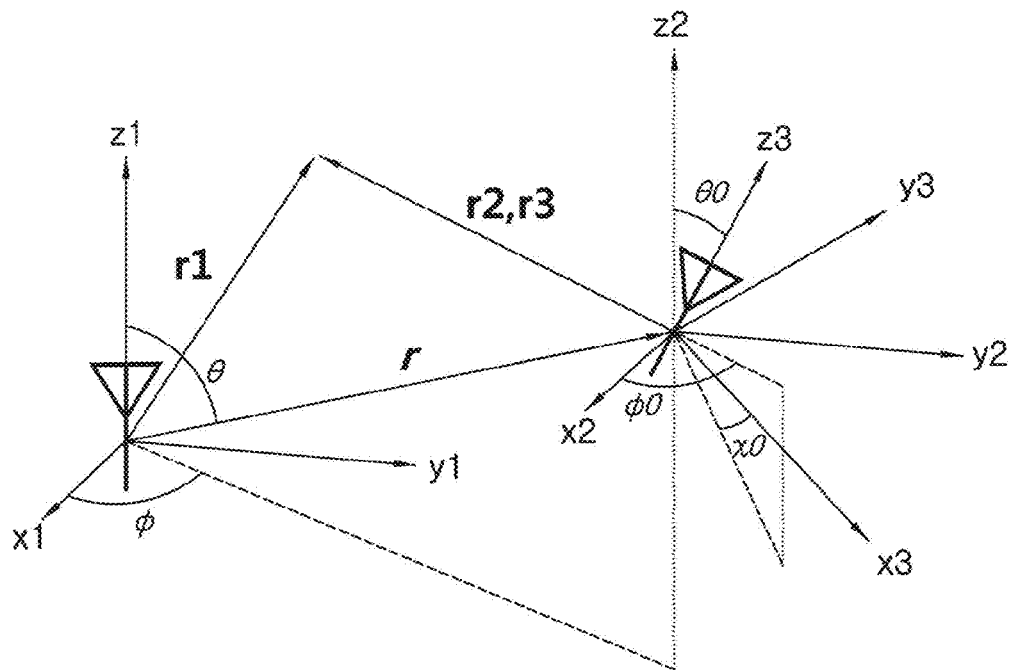
FIG. 1 illustrates coordinate systems and antenna in accordance with one example embodiment of the present invention.

The detailed description of the present invention illustrates specific embodiments in which the present invention can be performed with reference to the attached drawings.

In the following detailed description, reference is made to the accompanying drawings that show, by way of illustration, specific embodiments in which the present invention may be practiced. These embodiments are described in sufficient detail to enable those skilled in the art to practice the present invention. It is to be understood that the various embodiments of the present invention, although different from one another, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled.

To investigate the characteristics of the wireless power transfer, it is needed to analyze a mutual coupling of antennas because the power transfer takes place between antennas through the coupling phenomenon. The applicant analyzes the antenna coupling by using spherical modes and an antenna scattering matrix. The coupling between antennas may be described in terms of the Z-parameter. The Z-parameter between two antennas were derived in earlier article titled "Scattering properties and mutual coupling of antennas with prescribed radiation pattern" authored jointly by W. Wasylkiwskyj and W. K. Kahn and published in *IEEE Trans. Antennas Propagat.*, vol. 18, no. 6, pp. 741-752, November 1970 by representing an antenna as a network and considering antenna coupling as an interconnection of networks. In accordance with an example embodiment of the present invention, the Z-parameter derived in the article by Wasylkiwskyj and Kahn is expressed in terms of the addition theorem. Further, a formula that calculates the maximum power transfer efficiency and the optimum load impedance from the Z-parameter is also presented. In accordance with one example embodiment of the present invention, to simplify the formula, antennas are assumed to be canonical minimum scattering (CMS) antennas. The applicant investigated whether there was any spherical mode that is more efficient for wireless power transfer compared with a fundamental mode, and found that the efficiency of wireless power transfer increases as order of spherical mode increases. In addition, the applicant proves that this is also valid when antennas are not CMS antennas. Finally, in accordance with an example embodiment of the present invention, a new antenna system and a method using the new antenna system which generate a higher order spherical mode(s) should be adopted to achieve an efficient wireless power transfer.

Matrix Description of an Antenna

A. Antenna Scattering Matrix

Electric fields and magnetic fields outside the sphere enclosing an antenna may be expressed as a superposition of spherical modes.

The mode coefficients at an antenna's local port and spherical mode coefficients are related by the matrix equation as follow:

$$\begin{bmatrix} w \\ b \end{bmatrix} = \begin{bmatrix} \Gamma & R \\ T & S \end{bmatrix} \begin{bmatrix} v \\ a \end{bmatrix}, \quad (1)$$

where v is a coefficient of the incident wave at the antenna's local port and w is a coefficient of the reflected wave at the antenna's local port. Additionally, a is an infinite dimensional column matrix including the coefficients of the incoming spherical modes and b is an infinite dimensional column matrix including the coefficients of the outgoing spherical modes. Mode functions are normalized such that the square of the absolute value of the coefficient is twice the power carried by each wave. The spherical mode functions used in the present invention are the same as those used in EM simulator 'FEKO, EM Software & Systems-S.A. (Pty) Ltd'. Although the sequence of the mode coefficients is arbitrary, modes are arranged in the following manner in accordance with an example embodiment of the present invention:

$TE_{-11}$, $TE_{01}$, $TE_{11}$, $TM_{-11}$, $TM_{01}$, $TM_{11}$, $TE_{-22}$, $TE_{-12}$, $TE_{02}$, $TE_{12}$, $TE_{22}$, $TM_{-22}$, $TM_{-12}$, $TM_{02}$, $TM_{12}$, $TM_{22}$, . . . , $TE_{mn}$, . . . , $TM_{mn}$, . . . .

Let $a_j$ and $b_j$ be, respectively, the j-th element of a and b. When s=1 denotes the TE mode and s=2 denotes the TM mode, j and the mode numbers are related by $$j=(s-1)(2n+1)+(2n-1)(n+1)+m, \quad (2)$$

where m and n are respectively the mode indexes in $TE_{mn}$ and $TM_{mn}$.

When the radiation efficiency of the matched antenna is $\eta_{rad}$, $$\sum_{j=1}^{\infty} |T_j|^2 = \eta_{rad}, \tag{3}$$

where $T_j$ is the j-th element of T in (1), as the radiated power is $\eta_{rad}/2$ when v is 1. The receiving pattern of a reciprocal antenna can be found from the radiation pattern. R can be determined with the equation below:

$$R_{smn} = (-1)^m T_{s-mn}, \tag{4}$$

In this equation, the subscripts come from (2).

B. Canonical Minimum Scattering Antenna

The canonical minimum scattering antenna, i.e., CMS antenna, means an antenna that does not scatter the electromagnetic fields when its local ports are open-circuited. The assumption of the CMS antenna is considered reasonable for antennas that are small compared with wavelength. The scattering matrix of the CMS antenna that is lossless and matched was derived in article titled "Minimum-scattering antennas" authored jointly by W. K. Kahn and H. Kurss and published in *IEEE Trans. Antennas Propagat.*, vol. 13, no. 5, pp. 671-675, September 1965.

Hereinafter, the scattering matrix of the CMS antenna that is not lossless and not matched is derived.

The component equations of (1) are as follows:

$$w = \Gamma v + Ra \tag{5a}$$

$$b = Tv + Sa \tag{5b}$$

If the local port is open-circuited, then $$w = v \tag{6}$$

a. Employing (5) and (6), one obtains $$b = \left(\frac{1}{1-\Gamma} TR + S\right) a \tag{7}$$

For an antenna to appear as free-space, $$\frac{1}{1-\Gamma} TR + S = I, \tag{8}$$

where I is a unit matrix. Therefore, S of the CMS antenna is $$S = I - \frac{1}{1-\Gamma} TR. \tag{9}$$

Mutual Coupling Between Two Antennas

A. Mode Coefficient Conversion

FIG. 1 illustrates coordinate systems and antennas in accordance with one example embodiment of the present invention.

An antenna 1 is assumed to be on the origin of coordinate 1 (x1, y1, z1) and an antenna 2 on the origin of coordinate 3 (x, y3, z3), as shown in FIG. 1. In this case, coordinate 2 (x2, y2, z2) is obtained by translating coordinate 1 by r and coordinate 3 is obtained by rotating coordinate 2. It is assumed that two spheres enclosing each antenna do not overlap. To calculate a Z-parameter between two antennas, it is necessary to convert the mode coefficients in coordinate 1 into those in coordinate 3. To do so, first, the mode coefficients in coordinate 1 are converted into those in coordinate 2 by means of the addition theorem. Second, the mode coefficients in coordinate 2 are converted into those in coordinate 3.

The mode coefficients conversion can be computed with a matrix. Let $b^{(1)}$ be the mode coefficients of the outgoing waves in coordinate 1. Let $a^{(2)}$ and $b^{(2)}$ be mode coefficients of the incoming and outgoing waves in coordinate 2, respectively.

Herein, a case in which there are no incoming waves in coordinate 1 is assumed.

Then, in the sphere whose origin is that of coordinate 2 with a radius of $|r|$, $a^{(2)}$ and $b^{(2)}$ are obtained using the matrix equation $$a^{(2)} = b^{(2)} = \frac{1}{2} G^T(r, \theta, \phi) b^{(1)}, \tag{10}$$

where the i-th row and the j-th column of $G^T$ are defined as follows:

$$G_{ij}^T(r, \theta, \phi) = \begin{cases} A_{\mu\nu,mn}^{(4)}(r, \theta, \phi) & \text{when } s = \sigma \\ B_{\mu\nu,mn}^{(4)}(r, \theta, \phi) & \text{when } s \neq \sigma \end{cases} \tag{11}$$

where $i = (\sigma-1)(2\nu+1) + (2\nu-1(\nu+1) + \mu$, and j is identical to (2).

Herein, $A_{\mu\nu,mn}^{(4)}(r,\theta,\phi)$ and $B_{\mu\nu,mn}^{(4)}(r,\theta,\phi)$ are $$A_{\mu\nu,mn}^{(c)}(r) = (-1)^\mu \left(\frac{m-\mu}{|m-\mu|}\right)^{m-\mu} \frac{j^{\nu-n}}{2} \sqrt{\frac{(2n+1)(2\nu+1)}{n(n+1)\nu(\nu+1)}} \tag{12}$$

$$e^{j(m-\mu)\phi} \cdot \sum_{p=|n-\nu|}^{n+\nu} \left\{ j^p (2p+1)[n(n+1) + \nu(\nu+1) - p(p+1)] \right.$$

$$\sqrt{\frac{(p-|m-\mu|)!}{(p+|m-\mu|)!}} \cdot \begin{pmatrix} n & \nu & p \\ 0 & 0 & 0 \end{pmatrix}$$

$$\left. \begin{pmatrix} n & \nu & p \\ m & -\mu & \mu-m \end{pmatrix} z_p^{(c)}(kr) P_p^{|m-\mu|}(\cos\theta) \right\} i.$$

$$B_{\mu\nu,mn}^{(c)}(r) = (-1)^\mu \left(\frac{m-\mu}{|m-\mu|}\right)^{m-\mu} \frac{j^{\nu-n}}{2} \tag{13}$$

$$\sqrt{\frac{(2n+1)(2\nu+1)}{n(n+1)\nu(\nu+1)}} e^{j(m-\mu)\phi} \cdot \sum_{p=|n-\nu|+1}^{n+\nu+1} \left\{ j^p (2p+1) \right.$$

$$\sqrt{(n+\nu+1+p)(n+\nu+1-p)(n-\nu+p)(\nu-n+p)}$$

$$\sqrt{\frac{(p-|m-\mu|)!}{(p+|m-\mu|)!}} \cdot \begin{pmatrix} n & \nu & p-1 \\ 0 & 0 & 0 \end{pmatrix}$$

$$\left. \begin{pmatrix} n & \nu & p \\ m & -\mu & \mu-m \end{pmatrix} z_p^{(c)}(kr) P_p^{|m-\mu|}(\cos\theta) \right\}$$

where $$\left(\frac{m-\mu}{|m-\mu|}\right)^{m-\mu}$$

is defined as 1 when $m-\mu=0$ and $$\begin{pmatrix} j_1 & j_2 & j_3 \\ m_1 & m_2 & m_3 \end{pmatrix}$$

is the Wigner 3–j symbol.

Likewise, the relationship between $a^{(2)}(b^{(2)})$ and $a^{(3)}$ ($b^{(3)}$) can be expressed as the matrix equation $$a^{(3)} = G^R(\chi_0, \theta_0, \phi_0) a^{(2)} \qquad (14a)$$

$$b^{(3)} = G^R(\chi_0, \eta_0, \phi_0) b^{(2)} \qquad (14b)$$

where the i-th row and the j-th column of $G^R$ are defined as $$G^R_{ij}(\chi_0, \theta_0, \phi_0) = \begin{cases} D^n_{\mu m}(\chi_0, \theta_0, \phi_0) & \text{when } s = \sigma \text{ and } n = \nu \\ 0 & \text{otherwise,} \end{cases} \qquad (15)$$

where $$D^n_{\mu m}(\chi_0, \theta_0, \phi_0) = (-1)^{m-\mu} e^{jm\phi_0} d^n_{\mu m}(\theta_0) e^{j\mu\chi_0}. \qquad (16)$$

Herein, ($\bullet_0, \bullet_0, \bullet_0$) and $d^n_{\mu m}(\theta_0)$ are defined in [J. E. Hansen, *Spherical Near-field Antenna Measurements*, London: Peter Peregrinus LTd., 1988].

ii. Therefore, $$a^{(3)} = b^{(3)} = \frac{1}{2} G^R G^T b^{(1)}. \qquad (17)$$

Herein, $G^R G^T$ is referred to as $G^+$. The conversion of the coefficients in coordinate 3 into those in coordinate 1 is calculated in a similar manner. The conversion of the coefficients in coordinate 3 into those in coordinate 1 is calculated by the equation $$a^{(1)} = b^{(1)} = \frac{1}{2} G^- b^{(3)}, \qquad (18)$$

where $$G^- = G^T(r, \pi - \theta, \pi + \phi) G^R(-\phi_0, -\theta_0, -\chi_0). \qquad (19)$$

A. Z-parameter between Two Antennas

FIG. 2 is a drawing presenting a network representation of two coupled antennas in accordance with one example embodiment of the present invention.

The coupling of two antennas may be considered as the cascading of a transmitting antenna network 210, a space network 220, and a receiving antenna network 230, as shown in FIG. 2. Hereinafter, the antenna networks 210, 230 are expressed as a scattering matrix and the space network 220 is expressed via the Z-parameter. Each antenna is assumed to radiate N modes. Thus, the number of ports in the space network 220 is 2N. A Port 1 to a port N in the space network 220 may correspond to the mode ports for coordinate 1 and a port N+1 to a port 2N may correspond to the mode ports of coordinate 3. The incoming spherical mode is considered as a reflected wave and the outgoing spherical mode is considered as an incident wave at the port of the space network. The ordering of the modes in the space network 220 is identical to that of the scattering matrix in (1). Let the characteristic impedance of the port of the space network 220 be 1.

When one outgoing spherical mode is excited at coordinate 1, the coefficients of the incoming and outgoing waves generated at coordinate 3 are identical according to the addition theorem.

At coordinate 1, no other modes are generated. Thus, all ports except the port for which the source is excited appear open-circuited.

Therefore, denoting a p-th row and q-th column of the Z-parameter of the space network by $Z^S_{p,q}$, $$Z^S_{N+i,j} = \frac{a^{(3)}_i + b^{(3)}_i}{b^{(1)}_j} = G^+_{ij} \qquad (20a)$$

$$Z^S_{i,N+j} = \frac{a^{(1)}_i + b^{(1)}_i}{b^{(3)}_j} = G^-_{ij} \qquad (20b)$$

where $1 \leq i, j \leq N$. Therefore, the Z-parameter of the space network is $$Z^S = \begin{bmatrix} I & G^- \\ G^+ & I \end{bmatrix}. \qquad (21)$$

The scattering matrices of antennas 1 and 2 are, respectively, $$S^{(1)} = \begin{bmatrix} \Gamma_1 & R_1 \\ T_1 & S_1 \end{bmatrix}, S^{(2)} = \begin{bmatrix} \Gamma_2 & R_2 \\ T_2 & S_2 \end{bmatrix}. \qquad (22)$$

Herein, and $S^{(1)}$ and $S^{(2)}$ refer respectively to coordinate 1 and coordinate 3. Let the characteristic impedance of the local port of antenna 1 and 2 be, respectively, $Z_{01}$ and $Z_{02}$.

To determine the $Z_{11}$ and $Z_{21}$ values of the Z-parameter between the two antennas, we excite a current $i_1$ at the local port of antenna 1 and open the local port of antenna 2. Then, the matrix equations are $$\begin{bmatrix} V_1 \\ V_2 \end{bmatrix} = \begin{bmatrix} I & G^- \\ G^+ & I \end{bmatrix} \begin{bmatrix} I_1 \\ I_2 \end{bmatrix} \qquad (23a)$$

$$\begin{bmatrix} \frac{1}{2}(v_1/\sqrt{Z_{01}} - i_1\sqrt{Z_{01}}) \\ \frac{1}{2}(V_1 + I_1) \end{bmatrix} = \begin{bmatrix} \Gamma_1 & R_1 \\ T_1 & S_1 \end{bmatrix} \begin{bmatrix} \frac{1}{2}(v_1/\sqrt{Z_{01}} + i_1\sqrt{Z_{01}}) \\ \frac{1}{2}(V_1 - I_1) \end{bmatrix} \qquad (23b)$$

$$\begin{bmatrix} \frac{1}{2}(v_2/\sqrt{Z_{02}}) \\ \frac{1}{2}(V_2 + I_2) \end{bmatrix} = \begin{bmatrix} \Gamma_2 & R_2 \\ T_2 & S_2 \end{bmatrix} \begin{bmatrix} \frac{1}{2}(v_2/\sqrt{Z_{02}}) \\ \frac{1}{2}(V_2 - I_2) \end{bmatrix} \qquad (23c)$$

where $V_1$ and $V_2$ are the voltages and $I_1$ and $I_2$ are the currents of the space network. The $Z_{12}$ and $Z_{22}$ values are obtained by exciting the current at the local port of antenna 2 and opening the local port of antenna 1. The Z-parameter of cascaded networks was derived in the article titled "Scattering properties and mutual coupling of antennas with prescribed radiation pattern" authored jointly by W. Wasylkiwskyj and W. K. Kahn and published in *IEEE Trans. Antennas Propagat.*, vol. 18, no. 6, pp. 741-752, November 1970 when the characteristic impedance of the local ports was 1. Herein, the Z-parameter between the two antennas' local ports is $$Z_{11} = Z_{01}\frac{1+\Gamma_1}{1-\Gamma_1} - \frac{Z_{01}}{2(1-\Gamma_1)^2}R_1 \quad (24a)$$

$$G^-(I-S_o^{(2)})\cdot G^+\left[I - \frac{1}{4}(I-S_o^{(1)})G^-(I-S_o^{(2)})G^+\right]^{-1}T_1$$

$$Z_{21} = \frac{\sqrt{Z_{01}Z_{02}}}{(1-\Gamma_1)(1-\Gamma_2)}R_2\cdot G^+\left[I - \frac{1}{4}(I-S_o^{(1)})G^-(I-S_o^{(2)})G^+\right]^{-1}T_1 \quad (24b)$$

$$Z_{12} = \frac{\sqrt{Z_{01}Z_{02}}}{(1-\Gamma_1)(1-\Gamma_2)}R_1\cdot G^-\left[I - \frac{1}{4}(I-S_o^{(2)})G^+(I-S_o^{(1)})G^-\right]^{-1}T_2 \quad (24c)$$

$$Z_{22} = Z_{02}\frac{1+\Gamma_2}{1-\Gamma_2} - \frac{Z_{02}}{2(1-\Gamma_2)^2}R_2 \quad (24d)$$

$$G^+(I-S_o^{(1)})\cdot G^-\left[I - \frac{1}{4}(I-S_o^{(2)})G^+(I-S_o^{(1)})G^-\right]^{-1}T_2$$

where $$S_o^{(1)} = \frac{1}{1-\Gamma_1}T_1R_1 + S_1 \quad (25a)$$

$$S_o^{(2)} = \frac{1}{1-\Gamma_2}T_2R_2 + S_2. \quad (25b)$$

This formula is valid when the two spheres enclosing each antenna do not overlap. If antennas are CMS antennas, the Z-parameter is reduced to the following equation using (9).

$$Z_{11} = Z_{01}\frac{1+\Gamma_1}{1-\Gamma_1} \quad (26a)$$

$$Z_{21} = \frac{\sqrt{Z_{01}Z_{02}}}{(1-\Gamma_1)(1-\Gamma_2)}R_2 G^+ T_1 \quad (26b)$$

$$Z_{12} = \frac{\sqrt{Z_{01}Z_{02}}}{(1-\Gamma_1)(1-\Gamma_2)}R_1 G^- T_2 \quad (26c)$$

$$Z_{22} = Z_{02}\frac{1+\Gamma_2}{1-\Gamma_2} \quad (26d)$$

IV. Maximum Power Transfer Efficiency and Optimum Load Impedance

If the Z-parameter is given, the load impedance to which power is transferred maximally and the maximum power transfer efficiency can be calculated. Let the load impedance $Z_L$ be terminated at port 2 of the network and let the source be connected to port 1 of the network. The power transfer efficiency PTE is $$PTE = \frac{P_L}{P_{in}} = \frac{\text{Re}(Z_L)}{\text{Re}(Z_{in})}\left|\frac{Z_{21}}{Z_{22}+Z_L}\right|^2, \quad (27)$$

where $P_L$ is the power consumed in the load, $P_{in}$ is the power that enters the network, and $Z_{in}$ is the input impedance of the network. The maximum power transfer occurs where $$\frac{\partial PTE}{\partial \text{Re}(Z_L)} = 0, \quad \frac{\partial PTE}{\partial \text{Im}(Z_L)} = 0. \quad (28)$$

$\text{Re}(Z_L)$ and $\text{Im}(Z_L)$ that satisfy the above equation are determined as follows:

$$\text{Re}(Z_L) = \sqrt{\text{Re}(Z_{22})^2 - \frac{\text{Re}(Z_{22})}{\text{Re}(Z_{11})}\text{Re}(Z_{12}Z_{21}) - \frac{\text{Im}(Z_{12}Z_{21})^2}{4\text{Re}(Z_{11})^2}} \quad (29a)$$

$$\text{Im}(Z_L) = \frac{\text{Im}(Z_{12}Z_{21})}{2\text{Re}(Z_{11})} - \text{Im}(Z_{22}). \quad (29b)$$

when $\text{Re}(Z_{11}) \neq 0$.

Letting $$X_1 = \frac{Z_{12}}{\sqrt{\text{Re}(Z_{11})\text{Re}(Z_{22})}}, \quad X_2 = \frac{Z_{21}}{\sqrt{\text{Re}(Z_{11})\text{Re}(Z_{22})}}, \quad (30)$$

the maximum power transfer efficiency ($PTE^{max}$) is $$PTE^{max} = \frac{|X_2|^2}{2 - \text{Re}(X_1X_2) + \sqrt{4 - 4\text{Re}(X_1X_2) - \text{Im}(X_1X_2)^2}}. \quad (31)$$

If the antennas are reciprocal, then X1=X2. Letting X1 and X2 be X, the maximum power transfer efficiency becomes $$PTE^{max} = \frac{|X|^2}{2 - \text{Re}(X^2) + \sqrt{4 - 4\text{Re}(X^2) - \text{Im}(X^2)^2}}. \quad (32)$$

V. Enhancement of the Efficiency of Wireless Power Transfer Using Higher Order Modes On the basis of the formula presented above, a system for transferring wireless power using an order, higher than a predetermined value, of at least one mode index of spherical modes of antennas in accordance with an example embodiment of the present invention is more efficient for wireless power transfer compared with a conventional system using the fundamental mode. That is, in order to enhance the efficiency of the wireless power transfer, i.e., a power transfer efficiency, a control part(not shown) may allow respective spherical modes of the first antenna and the second antenna to have orders which are same as or larger than a predetermined value to thereby transfer wireless power between the first antenna and the second antenna.

To simplify the formula, we assume the antennas to be reciprocal CMS antennas that generate only one spherical mode. Let antenna 1 be on the origin of coordinate 1 and antenna 2 be on the origin of coordinate 3 as shown in FIG. 1. Suppose that $\theta_0$, $\phi_0$ and $\chi_0$ are 0. We assume that antenna 1 generates only one $TM_{0n}$ ($TE_{0n}$) mode and antenna 2 generates only one $TM_{0'}\cdot(TE_{0'})$ mode. Let the radiation efficiency of antenna 1 be $\eta_{rad1}$ and the radiation efficiency of antenna 2 be $\eta_{rad2}$.

In this case, X in (32) becomes $$X = \sqrt{\eta_{rad1}\eta_{rad2}}A_{0v,0n}^{(4)}(r,\theta,\phi). \quad (33)$$

from (3), (4), and (26).

Figure 3B:
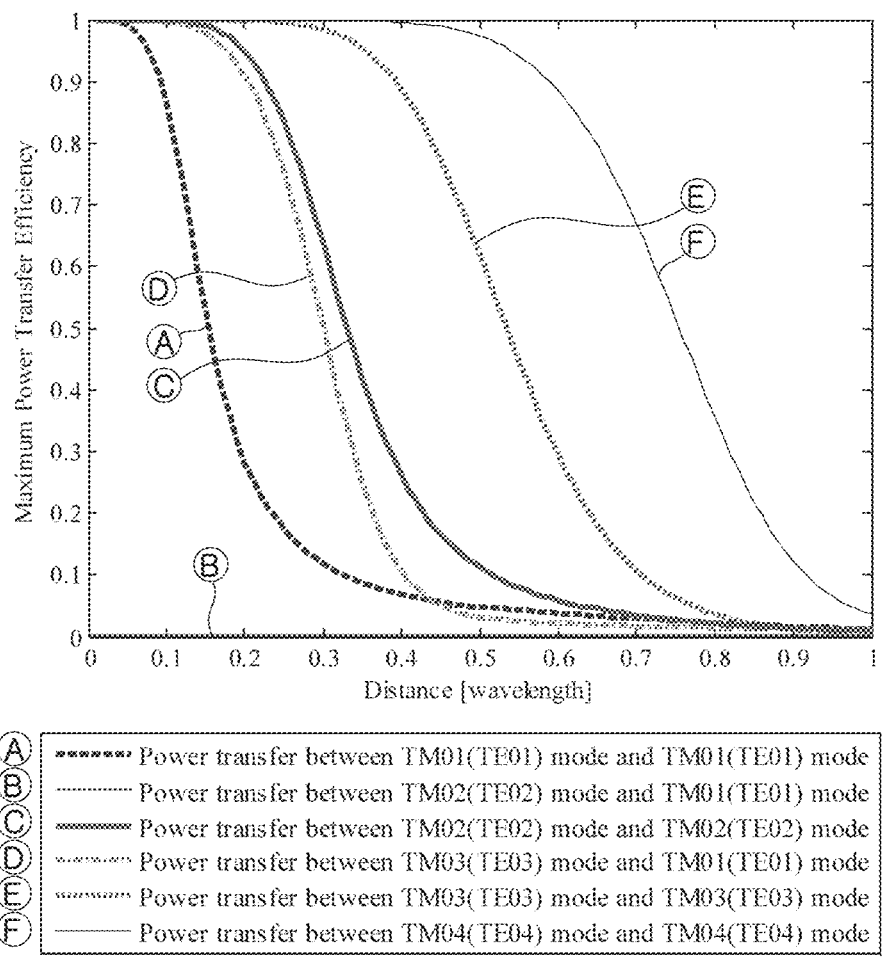

Using (32), the applicant could find that the maximum power transfer efficiency increases as the real part of X becomes closer to 1 or −1 and the absolute value of the imaginary part of X increases. Therefore, a mode for which the absolute value of the imaginary part of $A_{0v,0n}^{(4)}(r,\theta,\phi)$ is large is efficient for a wireless power transfer. Because the magnitude of $A_{0v,0n}^{(4)}(r,\theta,\phi)$ is higher for larger values of v and n, a higher order mode is efficient for a wireless power transfer. FIG. 3 shows the maximum power transfer efficiencies between the $TM_{0n}$ mode antenna and the $TM_{0v}$ mode antenna when the radiation efficiencies are 1. In FIG. 3, the maximum power transfer efficiency increases as the mode number increases.

When antennas generate the spherical mode with m not being 0 or multiple spherical modes, the antennas generating higher order spherical modes are also efficient for wireless power transfer. Because the magnitude of $A_{\mu v, mn}^{(4)}(r,\theta,\phi)$ is large when n or • is large, X in (32) can be increased by using higher order modes. The X can be computed by the method proposed by this invention.

When antennas are not CMS antennas, antennas that generate higher order spherical mode are also efficient for wireless power transfer, because the maximum power transfer efficiency is determined by the voltages and currents of the ports in the space network in FIG. 2. If antennas are lossless, the maximum power transfer efficiency is regardless of the networks of Antenna 1 and Antenna 2, and determined by the spherical mode coefficients in coordinate 1 and those in coordinate 3 (FIG. 2).

Figure 4:
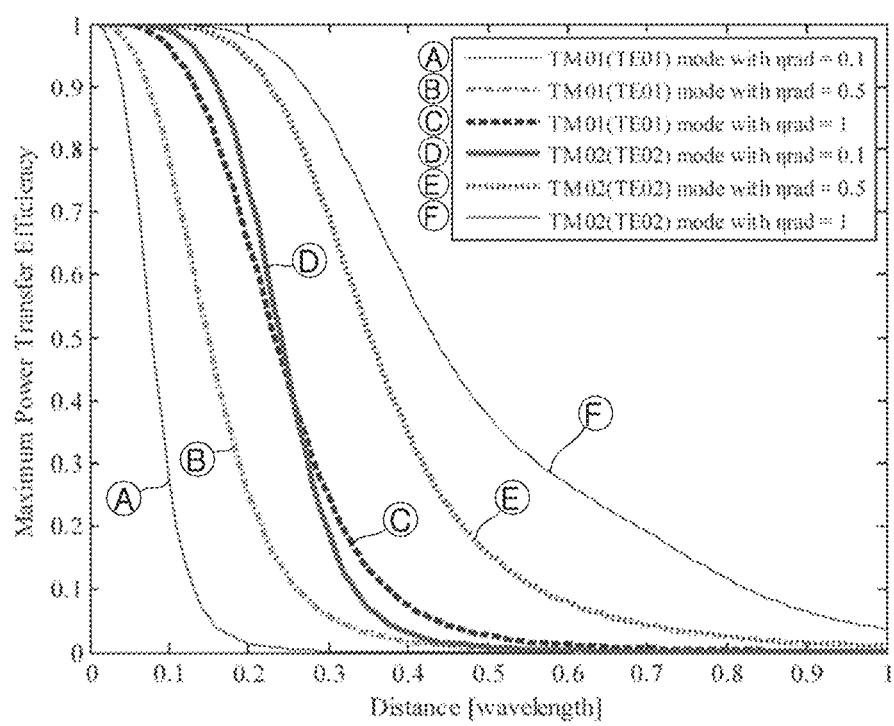
FIG. 4 shows the maximum power transfer efficiencies between two $TM_{01}(TE_{01})$ mode antennas and between two $TM_{02}(TE_{02})$ mode antennas for several radiation efficiencies in accordance with one example embodiment of the present invention.

The maximum power transfer efficiency increases with the radiation efficiency because the larger the radiation efficiency is, the larger the magnitude of X becomes. FIG. 4 shows the maximum power transfer efficiencies between two $TM_{01}$ ($TE_{01}$) mode antennas and between two $TM_{02}(TE_{02})$ mode antennas for several radiation efficiencies.

To make antennas that generate $TM_{02}(TE_{02})$ mode, the applicant locates two bodies that generate $TM_{01}(TE_{01})$ mode as shown in FIG. 5, and makes a difference of the phase of currents at two bodies be 180 degree.

In general, if antenna includes a first body that generates $TE_{mn}$ ($TM_{mn}$) mode, and a second body that also generates $TE_{mn}$ ($TM_{mn}$) mode, and if the first body and the second body are apart from each other and a phase of a current flowing in the first body and that in the second body are controlled to be different by 180 degree, a main spherical mode of the antenna may be $TE_{mn+1}(TM_{mn+1})$ so that the spherical mode of the antenna may be allowed to have an order which is same as or larger than a predetermined value which is an integer greater than 1.

VI. Experiment

Figure 6A:
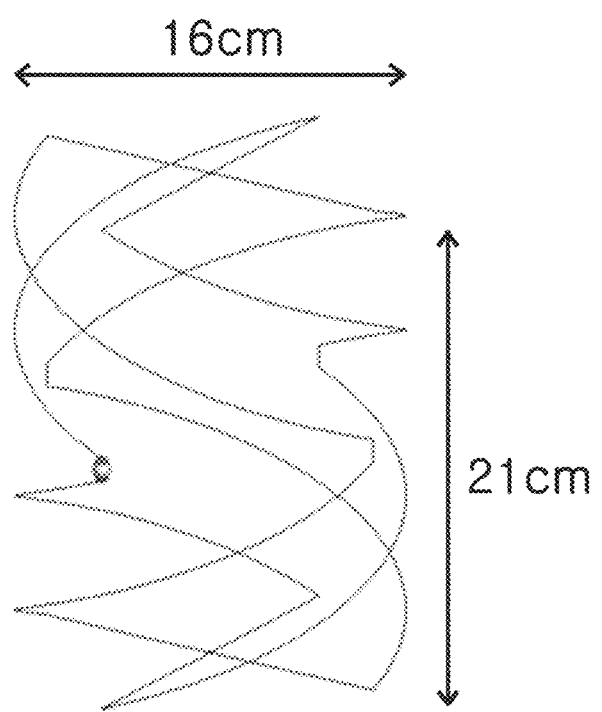
FIG. 6A shows a simulation model of $TM_{01}$ mode antenna.
Figure 6B:
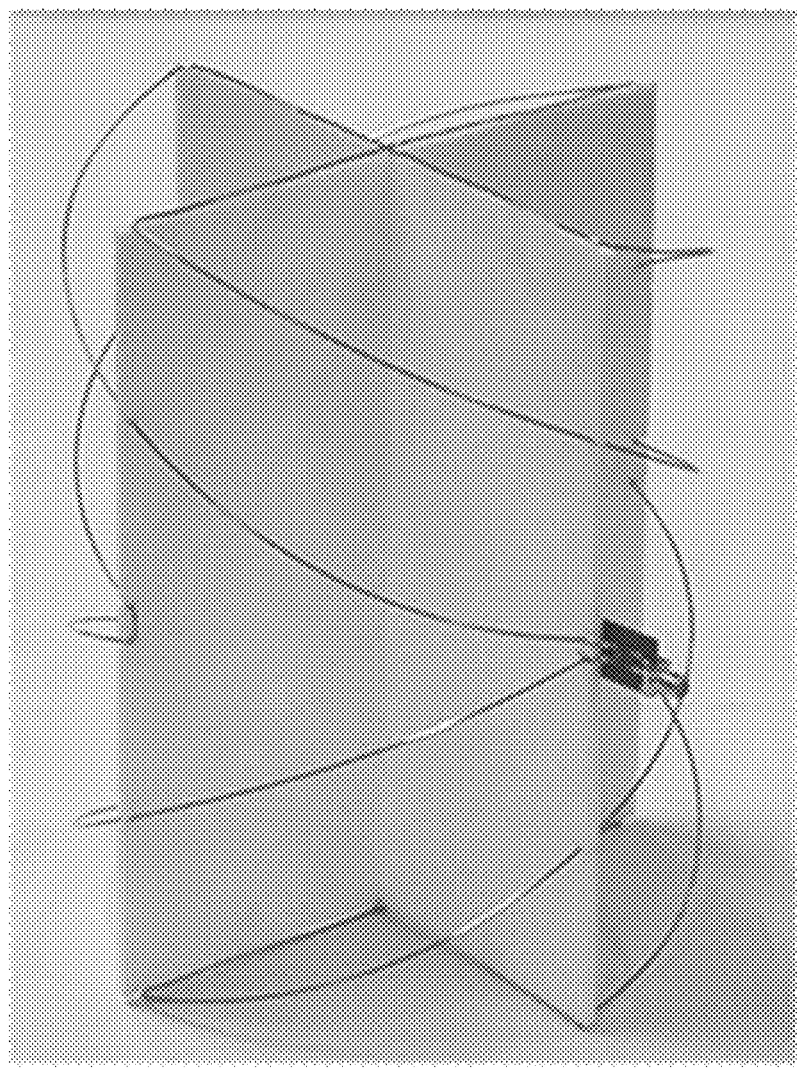
FIG. 6B shows a fabricated antenna of $TM_{01}$ mode antenna in accordance with one example embodiment of the present invention.

To verify the effects of the present invention, the applicant of the present invention created an antenna generating the $TM_{01}$ mode and another antenna generating the $TM_{02}$ mode for an experiment. To increase the radiation efficiency, the applicant used a folded cylindrical helix (FCH). A four-arm ½ turn FCH antenna was used as the $TM_{01}$ mode antenna as shown in FIG. 6. In detail, FIG. 6A shows a simulation model of $TM_{01}$ mode antenna; and FIG. 6B shows a fabricated antenna of $TM_{01}$ mode antenna. In this case, the radius of the FCH antenna is 8 cm and the height is 21 cm. The feeding port of the antenna is connected to a balun. To fabricate the $TM_{02}$ mode antenna, we excite each port of two four-arm ½ turn FCH antennas out of phase. To excite out of phase, the baluns connected to the feeding port were in the opposite direction.

Figure 7A:
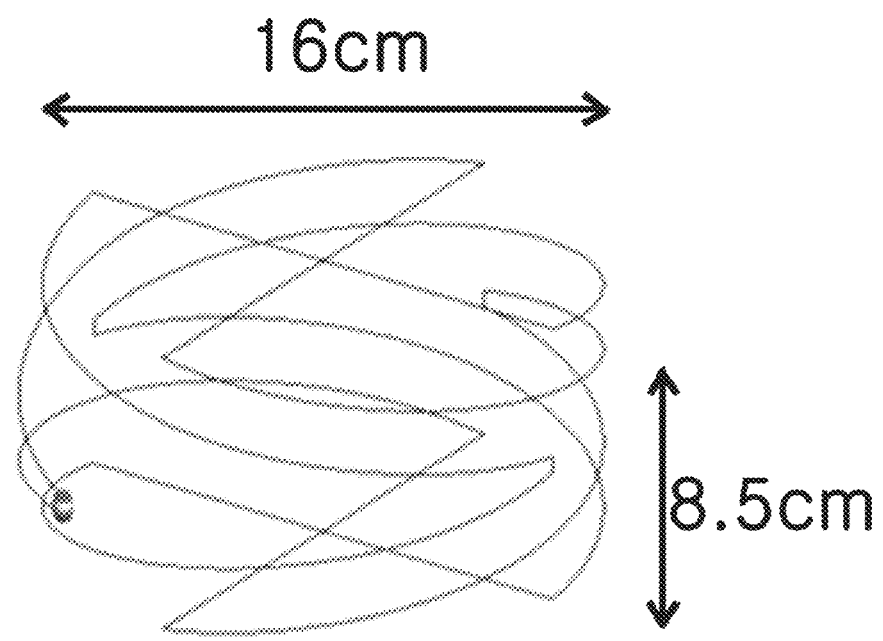
FIG. 7A shows an element of $TM_{02}$ mode antenna.
Figure 7B:
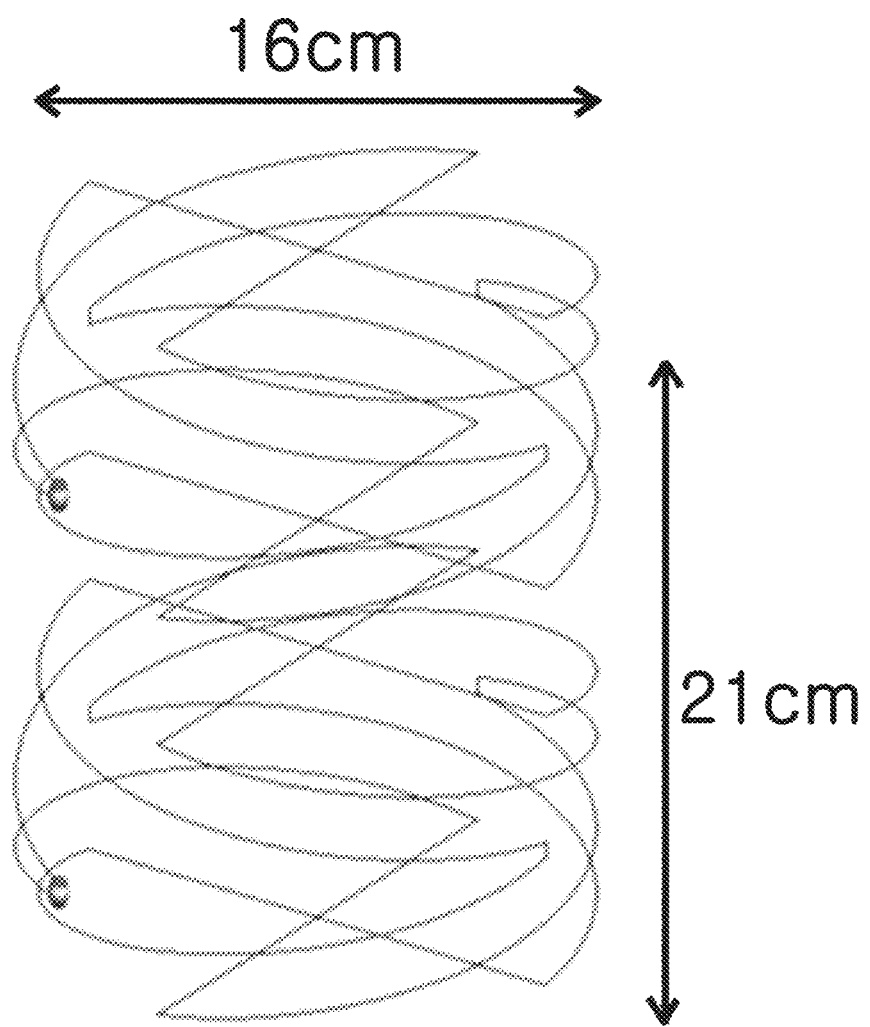
FIG. 7B shows a simulation model of $TM_{02}$ mode antenna.
Figure 7C:
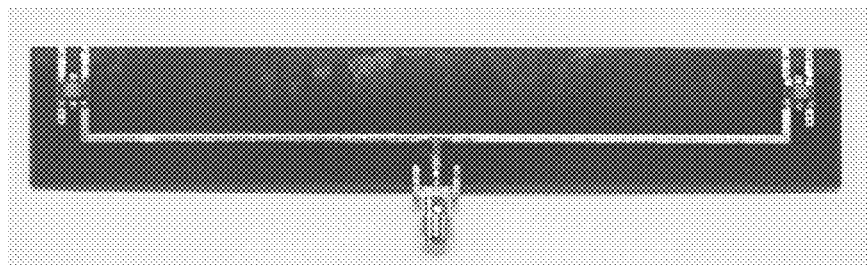
FIG. 7C shows a feeding circuit.
Figure 7D:
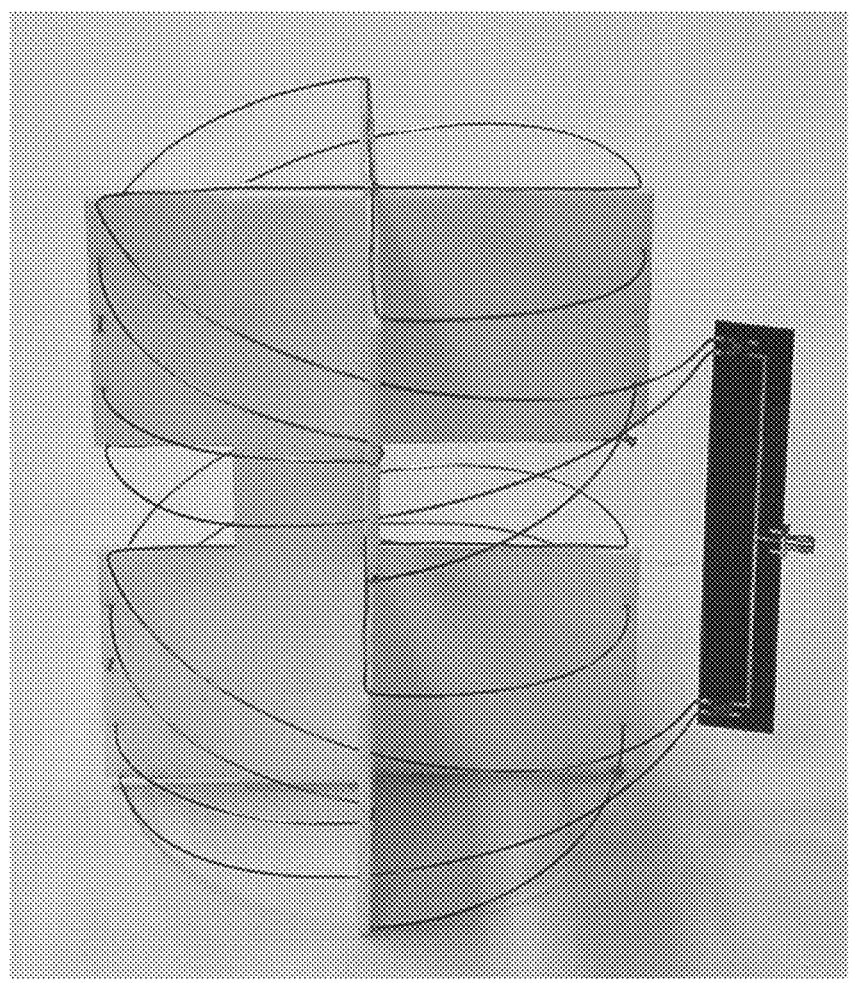
FIG. 7D shows a fabricated antenna for $TM_{02}$ mode in accordance with one example embodiment of the present invention.

The whole size of the $TM_{02}$ mode antenna is identical to that of the $TM_{01}$ mode antenna. FIG. 7A shows an element of $TM_{02}$ mode antenna; FIG. 7B shows a simulation model of $TM_{02}$ mode antenna; FIG. 7C shows a feeding circuit; and FIG. 7D shows a fabricated antenna for $TM_{02}$ mode. The material of all antennas is copper and the wire diameter is 1 mm.

The applicant simulated the antennas with FEKO, which is based on the method of moments. The baluns were measured and included in the simulation. The FCH antenna generates mostly the $TM_{01}$ mode and the FCH array antenna generates mostly the $TM_{02}$ mode in the simulation, as shown in Table I.

TABLE I

Mode Coefficients of the Matched Antenna (a) FCH Antenna at 260 MHz (b) FCH Array Antenna at 274 MHz

| Mode | Coefficient |
|---|---|
| (a) | |
| $TE_{-11}$ | 0.0234∠−10.2° |
| $TE_{11}$ | 0.0235∠−117.2° |
| $TM_{01}$ | 0.898∠88.2° |
| $TE_{02}$ | 0.0561∠−92.8° |
| (b) | |
| $TE_{01}$ | 0.0380∠146.6° |
| $TM_{02}$ | 0.444∠147.1° |
| $TE_{03}$ | 0.0332∠−33.0° |

The applicant also simulated the S-parameter between two coupled $TM_{01}$ mode antennas and S-parameter between two coupled $TM_{02}$ mode antennas with $\theta$, $\phi$, $\theta_0$, $\phi_0$, and $\chi_0$ set to 0. The maximum power transfer efficiency was calculated from the S-parameter using the simultaneous matching formula.

The maximum power transfer efficiency between the $TM_{01}$ mode antennas reaches its maximum at 260 MHz while the maximum power transfer efficiency between $TM_{02}$ mode antennas is largest at 274 MHz. The simulated radiation efficiency of the $TM_{01}$ mode antenna is 0.81 at 260 MHz and that of the $TM_{02}$ mode antenna is 0.20 at 274 MHz when the baluns are included.

Figure 8A:
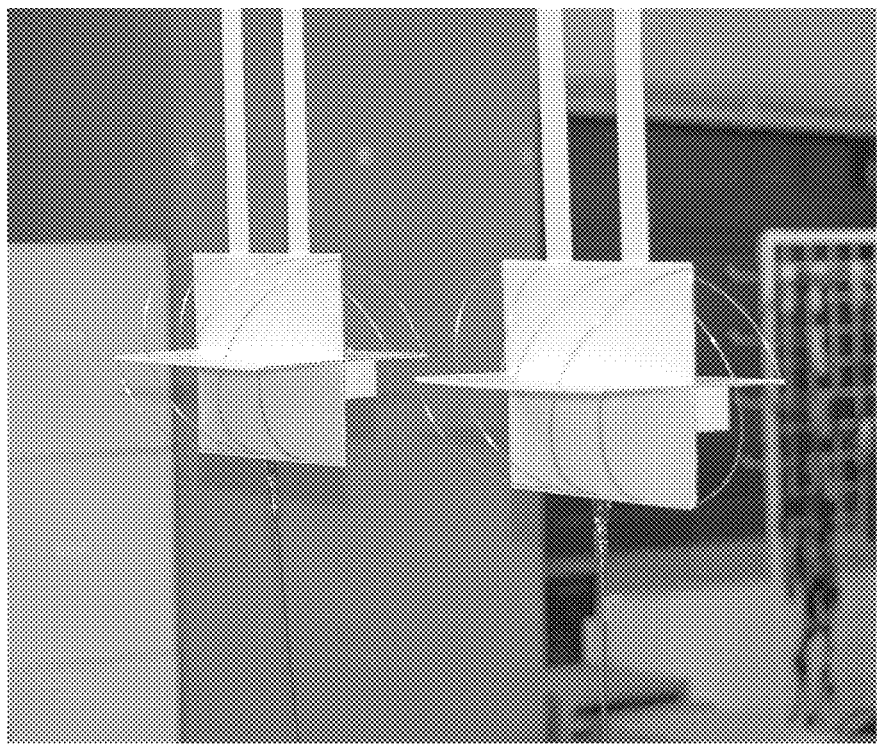
FIGS. 8A and 8B show respective power transfer experiments using $TM_{01}$ mode antennas and $TM_{02}$ mode antennas in accordance with one example embodiment of the present invention.
Figure 8B:
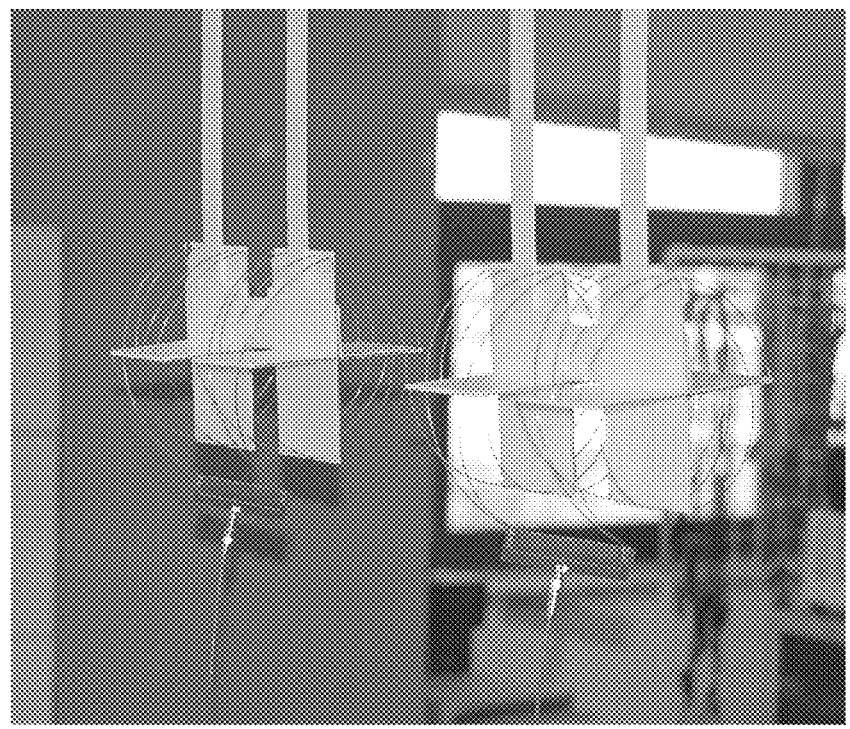
Figure 9A:
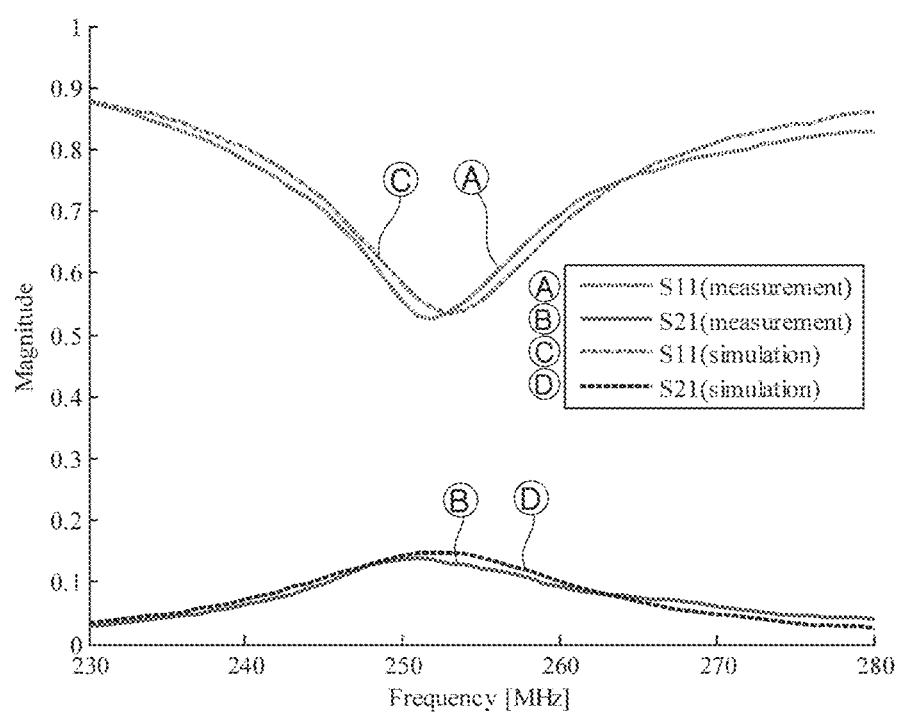
FIG. 9A to 9D show the simulated and measured S-parameters of the $TM_{01}$ mode and the $TM_{02}$ mode power transfer systems when the distance between the centers of the antennas is 50 cm in accordance with one example embodiment of the present invention.
Figure 9B:
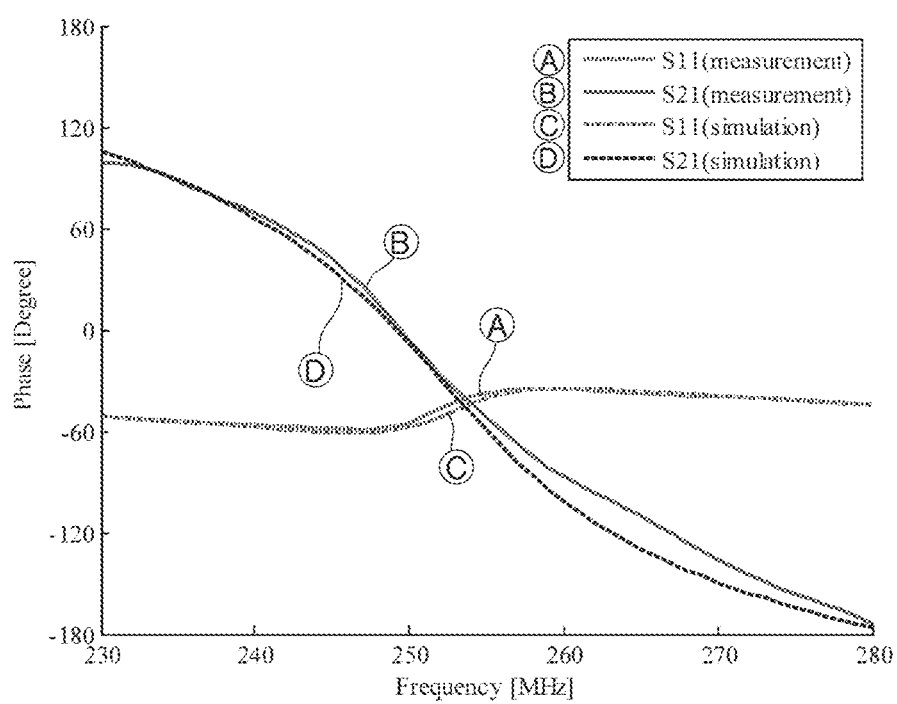
Figure 9C:
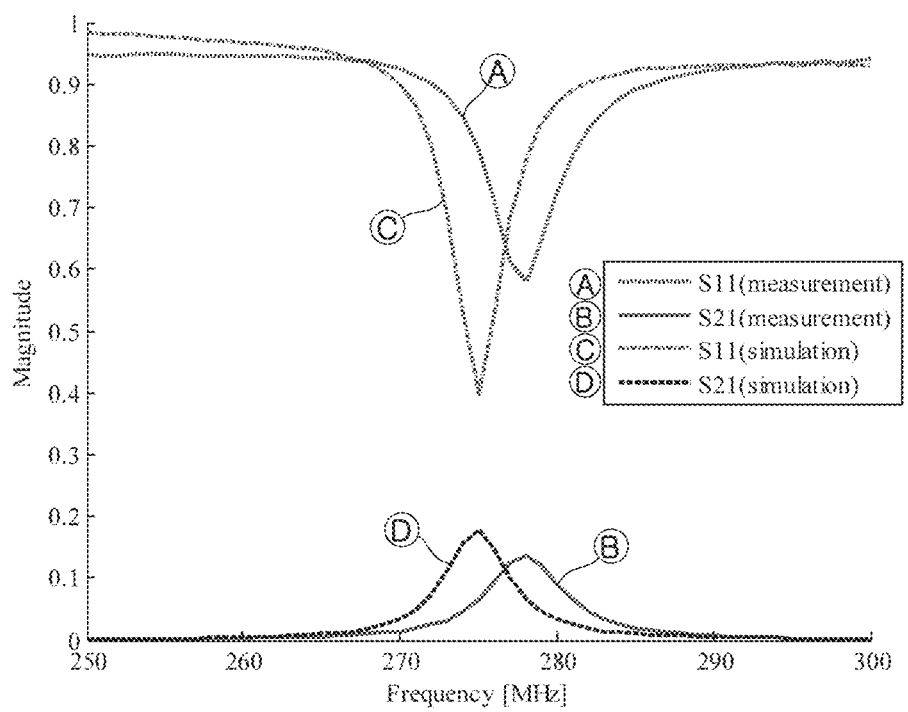
Figure 9D:
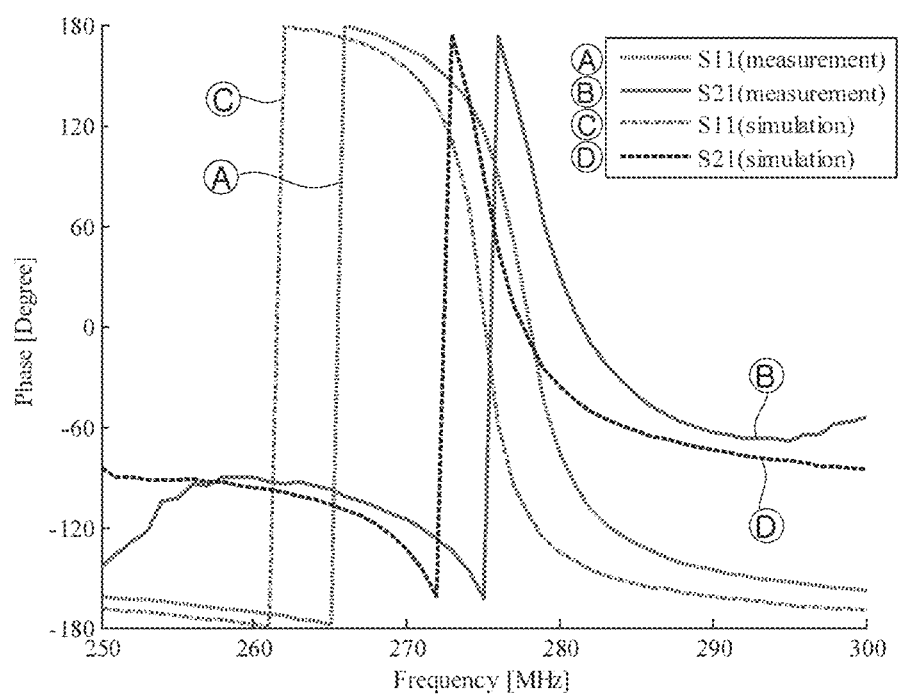
Figure 10:
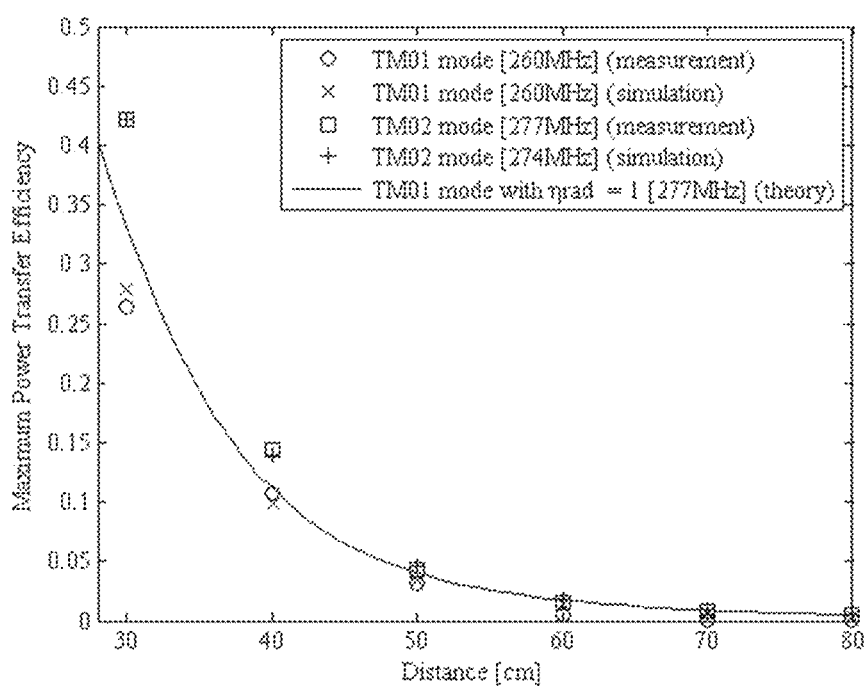
FIG. 10 shows the maximum power transfer efficiencies obtained from the simulation and measurement in accordance with one example embodiment of the present invention.

FIGS. 8A and 8B show respective power transfer experiments using $TM_{01}$ mode antennas and $TM_{02}$ mode antennas. We measured the S-parameter of the $TM_{01}$ mode and $TM_{02}$ mode power transfer systems with a vector network analyzer. We fixed $\theta$, $\phi$, $\theta_0$, $\phi_0$, and $\chi_0$ at 0 and varied r. FIG. 9A to 9D show the simulated and measured S-parameter of the $TM_{01}$ mode and the $TM_{02}$ mode power transfer systems when the distance between the centers of the antennas is 50 cm. In the case of the $TM_{02}$ mode antenna, the measured S-parameter changes slightly from the simulation due to errors in the fabrication. The maximum power transfer efficiency was calculated from the measured S-parameter using the simultaneous matching formula disclosed in D. M. Pozar, Microwave Engineering, 3rd ed., New York: John Wiely & Sons, Inc., 2005, pp. 548-550. The maximum power transfer efficiency between the $TM_{01}$ mode antennas is largest at 260 MHz and the maximum power transfer efficiency between the $TM_{02}$ mode antennas is largest at 277 MHz. FIG. 10 shows the maximum power transfer efficiencies obtained from the simulation and measurement in accordance with one example embodiment of the present invention. The maximum power transfer efficiency of the TM01 mode antennas at 260 MHz is 0.26 and that of the TM02 mode antennas at 277 MHz is 0.42 when the center-to-center distance between the antennas is 30 cm, which shows an improvement by 62% compared to the $TM_{01}$ mode antenna. Here, the maximum power transfer efficiency of the $TM_{02}$ mode power transfer system is higher than that of the $TM_{01}$ mode power transfer system with the radiation efficiency being 1.

Hitherto, $TM_{02}$ (or $TE_{02}$) mode was mostly considered but the present invention can also be applied to $TM_{20}$ (or $TE_{20}$) mode and the like. That is, the present invention can be applied to various cases in which at least one mode index of each spherical mode has an order same as or larger than the predetermined value which is an integer greater than 1.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variation equal or equivalent to the patent claims pertain to the category of the thought of the present invention.

What is claimed is:

1. A method for acquiring an efficiency of power transfer in a wireless power transfer system, wherein the wireless power transfer system includes a first antenna; and a second antenna which is located from the first antenna at an arbitrary distance and arranged in an arbitrary direction in comparison with the first antenna, and wherein respective spherical modes of the first antenna and the second antenna are allowed to have orders which are same as or larger than a predetermined value which is an integer greater than 1 to thereby transfer wireless power between the first antenna and the second antenna, comprising the steps of:

(a) acquiring scattering matrixes of the first antenna and the second antenna;

(b) acquiring a mode coefficients conversion matrix between the coordinate of the first antenna and that of the second antenna, (c) acquiring Z-parameter or Y-parameter, reflecting mutual coupling effect between the first antenna and the second antenna, by referring to the acquired scattering matrixes and mode coefficients conversion matrix; and (d) acquiring the maximum efficiency of power transfer between the first antenna and the second antenna by referring to the acquired Z-parameter or the Y-parameter.

2. The method of claim 1, wherein at least one mode index of each spherical mode has an order same as or larger than the predetermined value.

3. The method of claim 1, wherein the distance between the first antenna and the second antenna is determined by referring to a range which allows a first antenna sphere enclosing the first antenna and a second antenna sphere enclosing the second antenna not to be overlapped.

* * * * *